Feb. 8, 1966    J. G. DAUNT ETAL    3,233,460
METHOD AND MEANS FOR MEASURING LOW TEMPERATURE
Filed Dec. 11, 1961    3 Sheets-Sheet 1
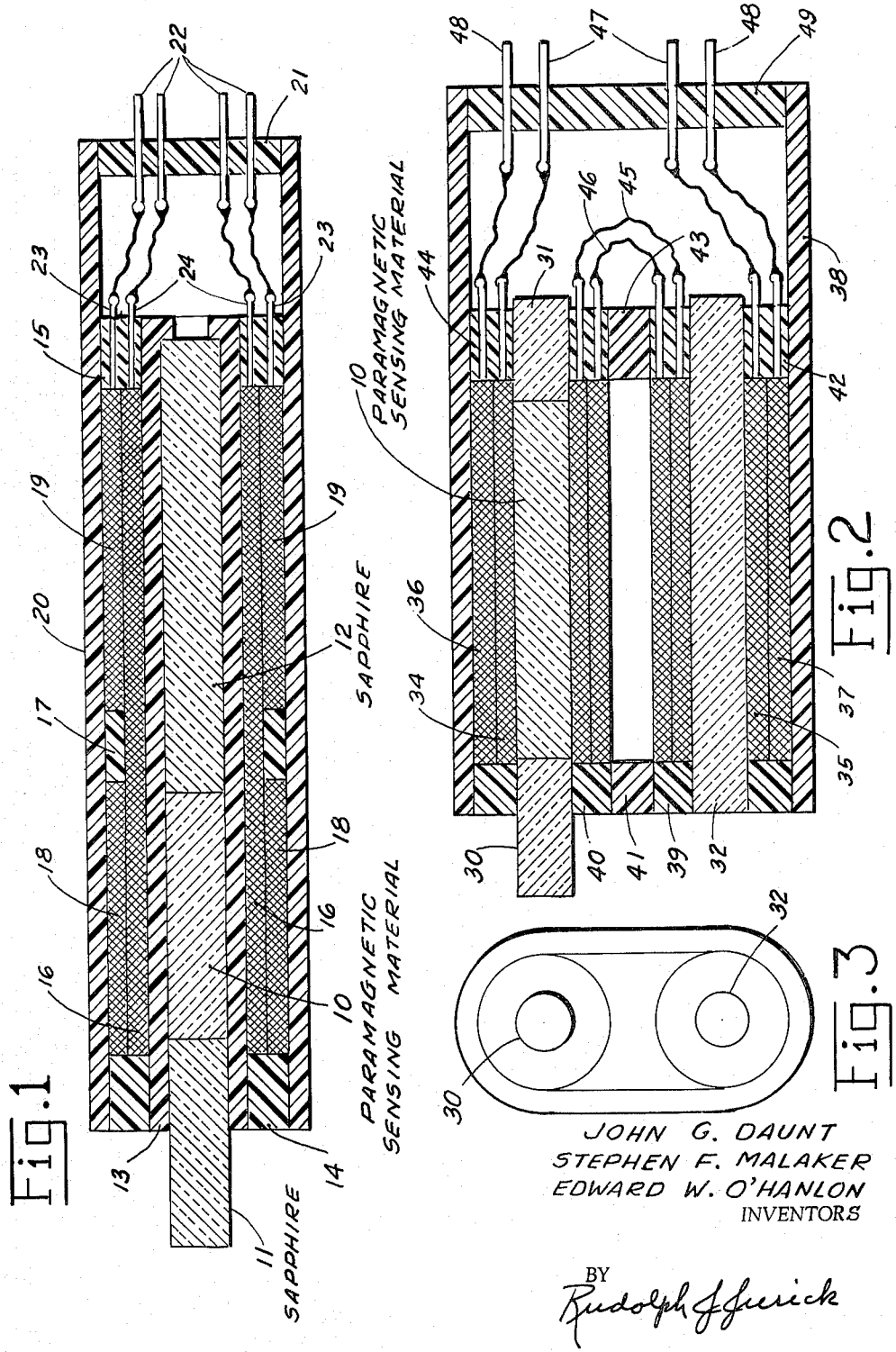
JOHN G. DAUNT
STEPHEN F. MALAKER
EDWARD W. O'HANLON
INVENTORS
BY
Rudolph J. Jurick

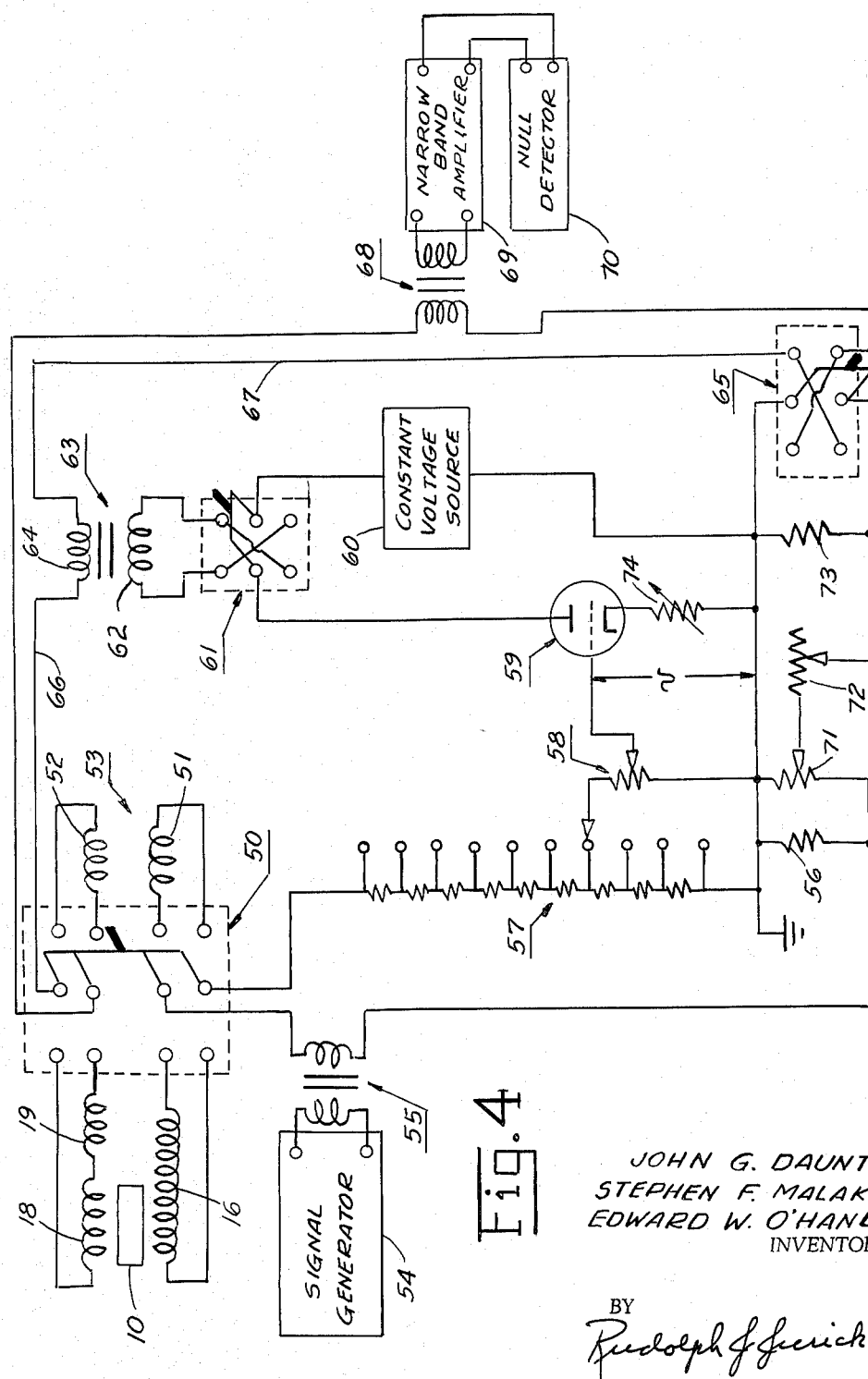

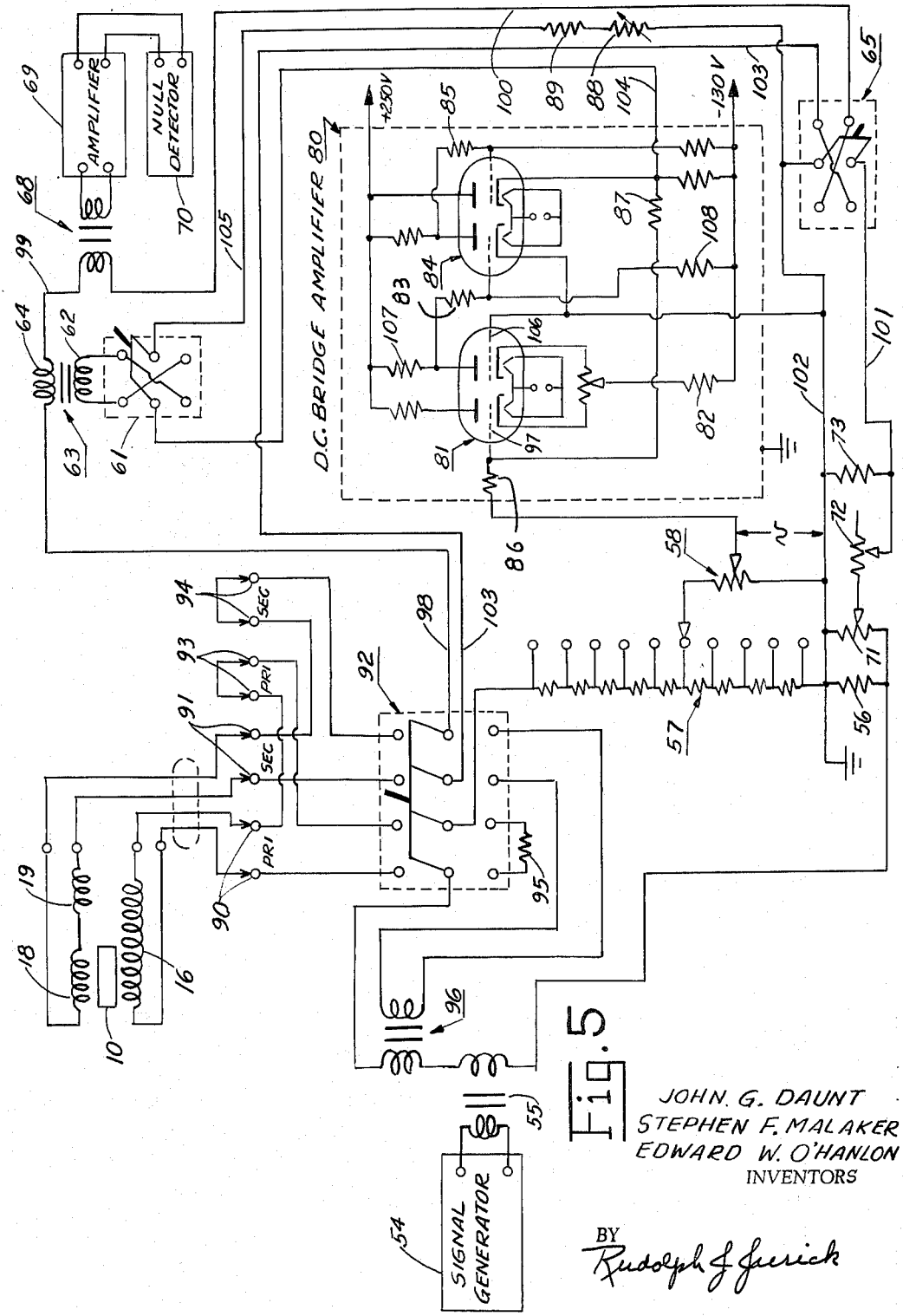

:::

United States Patent Office 3,233,460
Patented Feb. 8, 1966

---

3,233,460
METHOD AND MEANS FOR MEASURING LOW TEMPERATURE
John G. Daunt, Columbus, Ohio, and Stephen F. Malaker, Mountainside, and Edward W. O'Hanlon, Union, N.J., assignors to Malaker Laboratories, Inc., Mountainside, N.J., a corporation of New Jersey
Filed Dec. 11, 1961, Ser. No. 158,444
5 Claims. (Cl. 73—362)

This invention relates to an arrangement for the measurement of temperature and more particularly to an electronic cryogenic thermometer.

The basic instrument for standardizing temperature on an absolute scale is the gas thermometer, the use of which has permitted the establishment of fixed temperature points, as, for example, the boiling point of liquid helium, liquid hydrogen, liquid nitrogen, at standard atmospheric pressure. Secondary thermometers are then calibrated by immersion into such boiling liquids at standard pressure.

Considerable work has been done in determining the relationship between vapor pressure and absolute temperature for these liquids. Consequently, a measurement of vapor pressure can be used for the determination of temperature. However, the vapor pressure thermometer is limited to certain ranges of temperature and, further, has the disadvantage of involving difficult and cumbersome manometric observations.

Other secondary thermometers have been proposed for use at cryogenic temperatures, namely, the platinum resistance thermometer and the thermocouple thermometer. The platinum resistance thermometer is now established as a substandard thermometer covering the range from approximately 10° K. to 90° K. and higher. For this temperature range, the platinum thermometer is a satisfactory instrument, but it becomes very insensitive at lower temperatures and essentially is inoperable below about 10° K. Other resistance thermometers, made of semiconductor materials, are more suitable for the lowest temperature range, down to the order of 1° K., since their resistance increases with decreasing temperature. However, in the operation of resistance thermometers, extreme precautions must be taken to avoid spurious thermo-electric potentials which may arise by reason of temperature gradients within the system. Further, the main disadvantage of all resistance thermometers lies in the fact that there is no simple analytical formula relating the resistance of the thermometer to absolute temperature. In consequence, in order to provide an instrument for precise measurements, it is necessary to calibrate the particular instrument at a great many points within the temperature range which is to be measured. Calibration usually is performed against vapor pressure thermometers and while the resistance thermometer is precise at the specific points of calibration, it suffers from a lack of precision in those temperature ranges where interpolation is necessary.

Thermocouple thermometers, on the other hand, suffer from the fact that the thermoelectric power decreases markedly as the temperature is reduced. At very low temperatures, in the liquid helium range, for example, the thermoelectric powers of even the best thermocouple materials is minute, thereby making it very difficult to eliminate, or minimize, the effects of spurious thermoelectric potentials arising from the temperature gradients within the system. Again, the same general criticism must be made of thermocouple thermometers as in the case of resistance thermometers, namely, that the thermoelectric potential cannot be described by a simple, analytical formula, thereby resulting in a loss of precision in the interpolated regions between the fixed, temperature calibrations.

The electronic cryogenic thermometer described hereinbelow overcomes the shortcomings of devices heretofore available and provides a reliable measurement of temperature in the range of 0.25° K. to 25° K. Themperature measurements can be made readily, without need of special compensation, and can be read directly on a calibrated scale to extreme accuracies. Readouts are obtained from temperature-sensitive probes made from selected paramagnetic materials and surrounded by a mutual inductor, which probes are designed to fit conveniently into test Dewars. Changes in mutual inductance, corresponding to changes in the paramagnetic susceptibility of the sensing material with temperature, are measured by means of an A.C. bridge arranged so that the mutual inductance is proportional to the resistance of a potentiometer network having associated therewith a suitably-calibrated scale.

An object of this invention is the provision of a precise method and means for measuring extremely low temperatures.

An object of this invention is the provision of a compact cryogenic thermometer for measuring temperature in the range of 0.25° K. to 25° K. with a high degree of precision and reproducibility of readings.

An object of this invention is the provision of a device for measuring very low temperatures which device comprises a temperature-sensing element of paramagnetic material and means for indicating temperature values in correspondence with the changes of the magnetic susceptibility of the sensing material.

An object of this invention is the provision of an electronic cryogenic thermometer comprising a probe housing a paramagnetic material surrounded by a mutual inductor, an A.C. bridge adapted to become unbalanced in correspondence with changes in the mutual inductance of the inductor, adjustable means to rebalance the bridge, and means associated with the adjustable means for providing an indication of the temperature to which the probe is subjected.

An object of this invention is the provision of temperature measuring apparatus comprising a probe carrying a paramagnetic material surrounded by primary and secondary coils, means for passing a current of known frequency through the primary coil, an A.C. bridge responsive to the resulting voltage induced in the secondary winding and including means for balancing out the inductive and resistive components of the mutual inductance of the probe.

An object of this invention is the provision of a novel, very low frequency electronic bridge for use in the measurement of mutual inductance.

These and other objects and advantages will become apparent from the following description when taken with the accompanying drawings. It will be understood, however, that the drawings are for purposes of description and are not to be construed as defining the scope or limits of the invention, reference being had for the latter purpose to the claims appended hereto.

In the drawings wherein like reference characters denote like parts in the several views:

FIGURE 1 is a longitudinal cross-sectional view showing one embodiment of the temperature sensing probe;

FIGURE 2 is a similar view showing another embodiment of the sensing probe;

FIGURE 3 is an end view thereof;

FIGURE 4 is a schematic circuit diagram of the apparatus; and

FIGURE 5 is a schematic circuit diagram of an improved form of the apparatus.

Reference now is made to FIGURE 1 of the drawings wherein there is shown a rod 10 of paramagnetic sensing material, such as a natural or synthetic ruby, one end surface of which is thermally bonded to a sapphire rod 11. The free end of the sapphire rod 11 may be dipped into the liquid whose temperature is to be measured. Alternatively, copper or other metallic thermal connectors, attached to the point wherein it is desired to know the temperature, may be thermally and mechanically bonded to the free end of the rod 11 with suitable cement. The other end surface of the sensing material rod 10 is thermally bonded to a sapphire rod 12. This construction serves to make the probe mechanically and magnetically symmetrical. Sapphire is chosen for the rods 11 and 12 as it is not paramagnetic and has a very high thermal conductivity in the low temperature range for which this particular probe is designed.

The composite rod, consisting of the sapphire rods 11 and 12 and the paramagnetic material rod 10, is fitted within an axial bore provided in an inner former 13 which, preferably, is made of a paper or linen based phenolic resin. Any void spaces between the rods 10, 11 and 12 and the inner wall of the former 13 are filled with cement while the rods are inserted into the illustrated position, thereby hermetically sealing the paramagnetic material within the former 13. The former 13 carries end pieces, or bushings, 14 and 15, made of the same material as the former, between which a multi-turn primary winding 16 is accommodated, said winding encircling the paramagnetic material and extending substantially the entire length of the former.

After the primary winding 16 has been wound on the former 13, a center bushing 17, made of the same material as the former, is slipped over the primary winding and cemented into place, thereby providing two identical sections for accommodating the multi-turn secondary windings 18 and 19, each such secondary winding being wound directly on the primary winding 16 and having an axial length somewhat longer than that of the parmagnetic material rod 10. Actually, the secondary winding 18, which is disposed around the paramagnetic material, is the secondary winding proper whereas the equal winding 19 remote from the paramagnetic material, is a bucking winding. The two windings 18 and 19 are connected in electrical opposition so that in the absence of the paramagnetic material the mutual inductances between the primary winding 16 and each of the windings 18, 19, are equal and of opposite sign. It is desirable to use two, series-opposing secondary windings so that alternating currents which flow through the primary winding produce, essentially, no voltage in the secondary windings at relatively high tempeartures where the paramagnetic susceptibility of the sensing material 10 is small.

The probe is housed within a tubular shell 20 which preferably is made of the same material as the former 13 and which is cemented to the end bushings 14, 15 and center bushing 17. An insulator plug 21 closes the end of the shell 20 and carries the connecting pins 22 for connecting the probe into the electrical circuit. The series-connected secondary windings 18, 19 have terminal ends connected to pins 23 passing through the bushing 15, and the ends of the primary winding 16 are connected to similar pins 24, with flexible lead wires connecting the individual pins 23 and 24 to appropriate contact pins 22. The spaces between the secondary windings and the housing shell are filled with epoxy resin and the bushings 14, 15 and 17 are cemented to the shell, so that all windings are sealed from the atmosphere. This is important, in order to avoid condensation of water vapor, carbon dioxide and, particularly, air within the probe. In this connection, it has been noted that oxygen in the air, in the solid state, at lower temperatures, exhibits a very strong paramagnetism which could produce spurious results in the temperature measurement.

An alternative construction of the probe is shown in FIGURES 2 and 3. Here, the paramagnetic sensing material 10 is thermally bonded to the sapphire rods 30 and 31, the protruding rod 30 serving the same function as the rod 11 in the FIGURE 1 embodiment. A separate sapphire rod 32 is disposed parallel to and spaced from the composite rod. In this arrangement, the primary winding consists of two sections, the one section 34 being wound directly on the paramagnetic material rod 10 and the other section 35 being wound directly on the separate sapphire rod 32. One secondary winding 36 is then wound directly over the primary winding section 34 whereas the other secondary winding 37 is wound directly over the primary winding section 35. The rods are retained in proper position within the housing shell 38 by suitable bushings 39, 40, 41 at the forward end and the bushings 42, 43, 44 at the inner end. These bushings and the shell 38 are made of paper or linen-based phenolic resin. The ends of the windings are connected to pins passing through the bushings 42 and 44, with two ends of the primary winding sections connected together by a jumper 45 and the two secondary windings connected together by the jumper 46. Plug-in type connecting pins 47 and 48, carried by the plug 49, are connected to the ends of the primary winding sections and the secondary windings, respectively. The primary winding sections are connected so that for a given direction of current flow therethrough, they produce magnetic fields in opposite directions. This minimizes the external magnetic field produced by the windings and thereby minimizes the interaction effects of metallic objects which may be located proximate to the probe.

Reference now is made to the schematic circuit diagram of FIGURE 4, wherein the components carried by the probe are identified by the same reference numerals as in FIGURE 1, namely, the distributed primary winding 16, the series-opposed secondary windings 18, 19 and the paramagnetic sensing material 10. As shown, the probe windings are connected to the left, stationary contacts of a 4-pole double throw switch 50 through a suitable connection cable. The right, stationary contacts of this switch are connected individually to the two coils 51, 52 of a standard inductance 53. Closure of the switch to the left or to the right connects the probe windings or the standard inductance coils to a source of A.C. power and to an electronic bridge circuit.

A signal generator 54 provides the necessary alternating voltage through an input transformer 55, a fixed resistor 56 and a decade potentiometer 57. An adjustable voltage, taken from the potentiometer 57, is fed, through a second, fine adjustment potentiometer 58 to the grid of a triode tube 59 which is operated on the linear region of its characteristic. The voltage for the anode circuit of the tube is supplied by a constant voltage source 60, through a reversing switch 61 and primary winding 62 of a balancing mutual inductance 63, the secondary winding 64 being connected between the 4-pole switch 50 and another reversing switch 65, by the respective leads 66 and 67.

Included in the secondary circuit, which comprises the probe secondary coils 18 and 19 or the secondary coil 64 of the balancing mutual inductance 63, is an output transformer 68 which supplies a signal to a narrow band amplifier 69 tuned to the frequency of the signal generator 54. The amplifier output is fed to a null detector 70 which may be an indicating meter, oscilloscope, or etc.

It will be noted that the plate current of the tube 59 passes through the primary coil 62 of the balancing mutual inductance 63. The effective voltage ($v$) between the grid of the tube and ground determines the magnitude of the A.C. component of the plate circuit. The value of ($v$) is proportional to the product of the amount of resistance tapped from the potentiometers 57 and 58. Thus, by adjusting the potentiometers 57 and 58, one can adjust the level of the voltage induced in the secondary coil 64 of the balancing mutual inductance 63. This allows for a balancing of the inductive component of the mutual inductance of the probe or the standard inductance 53. The quadrature component of the potential induced in the secondary circuit can be balanced out by means of the resistance network comprising the potentiometers 71, 72 and the fixed resistors 56 and 73. This permits one to inject directly from the primary circuit into the secondary circuit a small out-of-phase potential.

In operation, the potentiometers 57 and 58 and the potentiometers 71 and 72 are adjusted so that both the inductive and resistive components of the mutual inductance of the probe or the standard inductance 53 are balanced to a null. The two reversing switches 61 and 65, in the inductive and resistive networks, respectively, make possible changes in the sign of the mutual inductance pick-up.

The purpose of the standard inductance 53 is to provide a means for setting the tube 59 at a reproducible operating point on its characteristic. This is accomplished as follows. The 4-pole switch 50 is closed to the right thereby connecting the standard inductance 53 into the circuit. Potentiometers 57 and 58 are then set to predetermined calibrating values (as, for example, 50 ohms on potentiometer 57 and 5,000 ohms on potentiometer 58) and a bridge balance is obtained by varying the bias voltage on the tube by means of the variable resistor 74 and by simultaneously adjusting the potentiometers 71 and 72. Once such balance has been obtained, the variable resistor 74 is locked into position and the switch 50 is closed to the left, thereby connecting the probe into the bridge circuit for temperature measurement purposes.

An improved arrangement of the bridge circuit is shown in the schematic circuit diagram of FIGURE 5, wherein the D.C. bridge amplifier 80 replaces the tube 59 used in the FIGURE 4 circuit. The bridge amplifier 80 makes it possible to dispense with the standard mutual inductance 53 and the switch 50 of FIGURE 3. This amplifier is provided with heavy feedback so that it is extremely stable, thereby obviating the need for periodic standardizing of the apparatus.

The input tube 81, type CK5755, is a specially selected, low drift, low noise tube, having spring-loaded cathodes and grids to eliminate microphonic disturbances. Both sides of the double triode are balanced, during manufacture, for matched parameters. The tube 81 is employed in a differential amplifier configuration having a large cathode resistor 82 to obtain common mode rejection. As shown, the differential amplifier has a single-ended output which is coupled by a highly stable resistor 83 to the grid of the second amplifier stage comprising the tube 84. Alternatively, the resistor 83 may be replaced by a neon tube.

The second amplifier stage employs a half section of the double triode tube 84 as a single amplifier, the output of which is coupled to the output section of the tube by the resistor 85, said output section being connected as a cathode follower. Since a phase reversal is required for negative feedback, the output of the differential amplifier is kept in phase with the voltage applied to the input grid of the tube 81 whereby the required phase reversal is obtained from the single amplifier stage of the tube 84.

The output impedance of the amplifier is the open loop gain output impedance divided by the feedback factor, which feedback factor can be in the range of 100 to 1,000, or more, in numerical value. In actual practice, the impedance of the amplifier is approximately 100 ohms. The closed loop gain of the amplifier is fixed by the ratio of the resistance value of the input resistor 86 and the feedback resistor 87. A ratio of 10, in this resistance network, sets the closed loop gain of the amplifier at a value of 10. A series resistor 88, in the form of a 10 turn Helipot and the fixed resistor 89, sets the static value of the bridge balance current with any input voltage derived from the input resistance network comprising the potentiometers 57 and 58. D.C. drift does not affect the balance of the bridge circuit providing the drift does not carry the operating parameters of the tubes into a non-linear operating region. A second consideration of the D.C. drift factor requires that it does not assume such a value as to effect a saturation of the core material of the balancing mutual inductance 63. The linearity of the amplifier is the open loop linearity divided by the feedback factor, which, in the illustrated arrangement, is better than one part per thousand.

The sensing probe, carrying the primary winding 16, the paramagnetic material 10, and the secondary windings 18, 19, is connected into the electrical circuit by means of a four-conductor cable and the terminals 90, 91. A 4-pole, double throw switch 92 has the upper stationary contacts connected to the terminals 90, 91. It will be noted, however, that one of the primary circuit leads is broken and brought to the terminals 93. Similarly, one of the secondary circuit leads is broken and brought to the terminals 94. Normally, the terminals 93 and the terminals 94 are short-circuited. However, in the event that the original probe is replaced by another probe having a mutual inductance which lies outside the range for normal balancing of the bridge circuit, a balancing mutual inductance can be connected to the terminals 93, 94 to effect such bridge balancing. The lower, stationary contacts of the switch 92 are individually connected to a calibrating resistor 95 and the secondary coil of a calibrating inductance 96. Thus, when the switch 92 is closed in the down position, the current from the signal generator 54 flows through the circuit consisting of the primary coil of the calibrating inductance 96, the calibrating resistor 95, the decade potentiometer 57 and the fixed resistor 56. At the same time, the voltage induced in the secondary coil of the calibrating inductance 96 is applied to the secondary circuit. The voltage ($v$) developed between the movable arm of the potentiometer 58 and ground, is applied to the control grid 97 of the tube 81, the magnitude of such input voltage being determined by the setting of the potentiometers 57 and 58. The voltage developed in the secondary coil of the calibrating inductance 96 causes a current to flow in the secondary circuit which comprises the lead 98, the secondary coil 64 of the balancing mutual inductance 63, the lead 99, the primary of the output transformer 68, leads 100 and 101 (assuming the reversing switch 65 is closed to the right), the potentiometers 72, 71, and the grounded return leads 102, 103. It will be noted that the output circuit of the bridge amplifier 80 comprises the lead 104, the primary coil 62 of the balancing mutual inductance 63, the lead 105, fixed resistor 89, and the Helipot 88, which is connected to the grounded lead 102 of the secondary circuit.

The alternating voltage ($v$) applied to the control grid 97 results in an amplified current flow through the associated anode-cathode circuit, which current is out-of-phase with the input voltage ($v$). Inasmuch as the grid 106, of the tube 81, is tied to ground, the alternating current flow through the first section of the tube produces corresponding voltage fluctuations of the tube cathode voltage which, in turn, results in an alternating current flow through the load resistor, the latter current being, however, in-phase with the input voltage ($v$). Consequently, the voltage applied to the control grid of the amplifier tube 84 is in-phase with the input voltage ($v$) (the magnitude thereof is determined by the ratio of the resistors 83 and 108) and the output voltage of the amplifier (appearing across the lead 104 and ground) is out-of-phase with the input voltage ($v$). Such output voltage is fed back to the control grid 97 through the feedback resistor 87. It will be apparent, therefore, that the voltage applied across the series circuit consisting of the primary coil of the balancing mutual inductance 63, the fixed resistor 89 and the Helipot 88 depends upon the gain of the amplifier 80. The resulting current induced into the secondary of the balancing mutual inductance 63 is outof-phase with and therefore cancels, the current already flowing in this secondary winding. This cancellation of the secondary current causes the null balance in the amplifier.

The circuit initially is balanced, or calibrated, by closure of the switch 92 in the down position and setting of the potentiometers 57 and 58 at the mid range positions. This results in an input voltage ($v$) of predetermined magnitude applied to the control grid 97, since the values of the calibrating resistor 95 and the potentiometers are preselected and constant and the output voltage of the signal generator 54 is of constant and known magnitude and frequency. The Helipot 88 is then adjusted so that the current flowing through the primary coil 62 of the balancing mutual inductance 63 balances the current flowing through the secondary coil 64 (by reason of the voltage induced in the secondary coil of the calibrating inductance 96) as indicated by the detector 70. Once such initial circuit balance has been obtained, the switch 92 is closed in the up position, thereby substituting the probe coils for the calibrating resistor 95 and the inductance 96. Any change in the mutual inductance between the primary and secondary coils of the probe results in a change in the current flow through the coil 64, of the balancing inductance 63, and the primary coil of the output transformer 68 and a corresponding deflection of the null detector 70. To re-establish a balanced circuit condition, the potentiometers 57 and 58 are adjusted to effect a necessary change in the input voltage ($v$). The potentiometers are provided with suitably calibrated dials whereby the setting of these potentiometers provides a direct reading of the temperature to which the probe is subjected. Alternatively, the dials can be calibrated in arbitrary values which are converted into temperature values by reference to a calibration chart.

It will be noted that the common point of the potentiometers 57 and 58 and the resistor 56 is connected to ground whereby the voltage developed across the resistor 56 is out-of-phase with that developed across the potentiometers. Also, the movable blades of the reversing switch 65 are connected across the resistor 56 through the potentiometers 71 and 72. This permits injecting a small, out-of-phase voltage directly into the secondary circuit of the bridge network to balance out the resistance component of the coils connected to the switch 92 and thereby obtain a precise circuit balance in the first instance.

The FIGURE 5 circuit offers the following advantages over that shown in FIGURE 4:

(1) A high input impedance and a low output impedance,
(2) A high degree of gain stability,
(3) Increased sensitivity with negligible drift,
(4) Improved linearity, and
(5) The elimination of the need for periodic standardizing of the apparatus between measurements.

Although the FIGURE 5 circuit has been described with specific reference to apparatus including a sensing probe for the measurement of temperature, it is apparent the circuit is not limited to such specific application. By calibrating the potentiometers 57 and 58 in terms of mutual inductance values, rather than temperature values, the apparatus constitutes a stable, precise, direct-reading mutual inductance bridge possessing outstanding advantages over the well known Hartshorn bridge utilizing a bulky, standard, mutual inductance which is varied to obtain the value of an unknown mutual inductance.

In order to calibrate the probe for the measurement of temperature, known, fixed temperature points are used. For convenience, two fixed temperature points can be obtained by immersion of the probe into boiling hydrogen and boiling helium at standard atmospheric pressure. Alternatively, the boiling point of helium and a point chosen with liquid helium boiling under reduced pressure may be used for calibration purposes, the corresponding temperature being taken from well known, established vapor pressure data. At each standard temperature point, the bridge is balanced by adjustment of the potentiometers 57, 58, 71 and 72.

As stated hereinabove, the magnetic susceptibility (X) of the probe sensing material 10, is inversely proportional to the absolute temperature, T, that is, $$X = \frac{C}{T} \quad (1)$$

where C is the Curie constant.

The bridge measures the mutual inductance and the changes in mutual inductance of the probe brought about by the change in the magnetic susceptibility of the sensing material with changes in temperature. The bridge is so arranged that the mutual inductance of the coils surrounding the paramagnetic material is proportional to the voltage ($v$) of the potentiometer network associated with the bridge, the value of ($v$) being read directly from calibrated dials associated with the slider of the potentiometers 57 and 58. In such arrangement, the relationship between the susceptibility of the paramagnetic material and the dial readings ($m$) is:

$$X = a'm + b' \quad (2)$$

where $a'$ and $b'$ are constants, and where $m$ is the product of the amount of resistance tapped off from the potentiometers 57 and 58.

Combining Equations 1 and 2 we obtain:

$$\frac{C}{T} = a'm + b' \quad (3)$$

and rearranging, $$T = \frac{1}{am + b} \quad (4)$$

$$a = \frac{a'}{C} \text{ and } b = \frac{b'}{C}$$

Equation 4 is a simple analytical expression and the unknown constants $a$ and $b$ can be evaluated by calibrating the particular probe at only two fixed, known temperature points.

For the temperature range of 1° K. to 25° K., we select chromium methylamine alum as the sensing material. This material obeys the Curie Law of Equation 1 with high accuracy over such temperature range, is reproducible and has been found experimentally to be entirely satisfactory. For the temperature range of 0.25° K. to about 4° K., we select a ruby crystal, particularly a synthetic ruby, for the sensing material. This material is extremely stable and reproducible and has many desirable characteristics for thermometric substances. It has, for example, a high thermal conductivity and low specific heat. Its magnetic susceptibility along the C axis, is given by:

$$X = \frac{C}{T}\left[1 + \frac{4}{5} \tanh \frac{\delta}{2kT}\right] \quad (5)$$

where, $\delta$ is the crystalline field splitting of the magnetic sub-levels, and $k$ is the Boltzmann constant. The magnitude of the crystalline field splitting $\delta$ is the same for both natural and synthetic ruby and its value is well known and characteristic of the material. Equation 5 is somewhat more complicated than Equation 1. However, it does give an exact analytical relationship between magnetic susceptibility and absolute temperature and for purposes of establishing the relationship between temperature and the dial readings ($m$) (read from the bridge) probe calibration at two standard temperatures, and only two standard temperatures, is necessary.

Let it be assumed that the values of ($m$) at two known calibrating temperatures $T_1$ and $T_2$ are, respectively, $m_1$ and $m_2$. Then, for a paramagnetic material which obeys Equation 1, the constants of Equation 3 can be determined by solving the following simultaneous equations:

$$T_1 = \frac{1}{am_1 + b} \quad (6)$$

$$T_2 = \frac{1}{am_2 + b}$$

For a paramagnetic material obeying the relationship given in Equation 5 the two constants can be determined by solving the simultaneous equations, $$am_1 + b = \frac{1}{T_1}\left[1 + \frac{4}{5}\tanh\frac{\delta}{2kT_1}\right]$$

$$am_2 + b = \frac{1}{T_2}\left[1 + \frac{4}{5}\tanh\frac{\delta}{2kT_2}\right] \quad (7)$$

Once these constants have been determined, the equation relating absolute temperature and the values of ($m$) become known and the readings of the calibrated dials associated with each of the potentiometers 57, 58 can be calibrated in absolute temperature values. Alternatively, if these dials are marked in arbitrary values, a graph can be constructed from the above equations and used to convert the dial readings to absolute temperature values.

This method of temperature measurement has many advantages. The primary advantage is the exact analytical expression between temperature and readings of the potentiometer network which allows precise interpolation of temperature readings at values of temperature between the fixed, calibration points, and, also, an exact extrapolation to higher temperature values. It has been found, moreover, that the precision of measurement can be made extremely high. Specifically, by using chromium methylamine alum in the probe, the precision of temperature measurement at 1° K. is better than 0.0001° K. Further, the apparatus does not suffer any difficulties due to spurious thermoelectric potentials, since the measurements are of an A.C. character and the reproducibility is extremely good. Once calibrated, the apparatus will serve as a stable, reliable secondary standard thermometer.

In general, the probe is of small size, substantially ½″ outside diameter by 2½″ long, and is connected to the measuring apparatus by leads of desired length. The measuring apparatus is entirely contained within a relatively small housing and is readily portable.

Having now described the invention, those skilled in this art will find no difficulty in making changes and modifications to meet required or desired specifications. It is intended that such changes and modifications shall fall within the scope and spirit of the invention as recited in the following claims.

We claim:

1. Apparatus for determining the mutual inductance between two coils comprising,
    (a) a calibrated potentiometer having input and output terminals, one input terminal and one output terminal being connected to ground,
    (b) means connecting the input terminals of the potentiometer to one of said coils thereby forming a primary circuit,
    (c) a source of alternating voltage of constant frequency and amplitude,
    (d) means applying said alternating voltage across the primary circuit,
    (e) a balancing mutual inductance having a primary and a secondary winding, said secondary winding being connected in series with the other of said coils thereby forming a secondary circuit,
    (f) a double-triode differential amplifier stage having a common cathode resistor and a pair of control grids, one of which is connected to ground,
    (g) means applying the voltage appearing across the potentiometer output terminals across the said two control grids,
    (h) an amplifier stage having a cathode connected to the grounded control grid of the differential amplifier stage and a control grid connected to an anode circuit of the differential amplifier stage,
    (i) a triode cathode follower stage having a cathode connected to the other control grid of the differential amplifier stage through a feedback resistor and a grid electrode connected to the anode of the amplifier stage through a coupling resistor,
    (j) means connecting the primary winding of the balancing mutual inductance between the cathode of the cathode follower stage and the grounded control grid of the differential amplifier stage, and
    (k) means responsive to the flow of current in the secondary circuit.

2. The invention as recited in claim 1, including a source of compensating voltage of the same frequency as the said alternating voltage, means injecting the said compensating voltage into the secondary circuit in opposition to the quadrature voltage induced in the said other coil in response to current flow in the said first coil, and means for adjusting the magnitude of the compensating voltage.

3. The invention as recited in claim 2, including a calibrating mutual inductance, a calibrating resistor having an ohmic value equal to that of the said one coil of the primary circuit, and switch means operable to substitute the calibrating resistor and inductance for the said one and other coils, respectively.

4. A cryogenic thermometer comprising,
    (a) a sensing probe carrying a rod of ruby thermally bonded to a rod of sapphire, a primary coil substantially distributed over the ruby and sapphire rods, and a secondary coil comprising two windings connected in opposition, with one winding encircling the ruby rod and the other winding encircling the sapphire rod,
    (b) a calibrated potentiometer having input terminals and output terminals, one input terminal and one output terminal being connected to ground,
    (c) a source of alternating voltage of constant frequency and amplitude,
    (d) means connecting the said primary winding to the potentiometer input terminals thereby forming a primary circuit,
    (e) means applying the said alternating voltage across the said primary circuit,
    (f) a balancing mutual inductance having a first winding connected in series with the secondary coil windings of the probe thereby forming a secondary circuit, and a second winding,
    (g) an amplifier having an input circuit connected to the potentiometer output terminals and an output circuit connected to the second winding of the balancing mutual inductance,
    (h) a null indicator coupled to the said secondary circuit, and
    (i) means in the amplifier output circuit for presetting the magnitude of the current flowing in the said second winding of the balancing mutual inductance when the calibrated potentiometer is set to a predetermined position.

5. The invention as recited in claim 4, wherein the said amplifier comprises,
    (a) a double-triode differential amplifier stage having a common cathode resistor and a pair of control grids one of which is connected to ground,
    (b) means applying the voltage appearing across the potentiometer output terminals across the said two control grids,
    (c) an amplifier stage having a cathode connected to the grounded control grid of the differential amplifier stage and a control grid connected to an anode circuit of the differential amplifier stage, and
    (d) a triode cathode follower stage having a cathode connected to the other control grid of the differential amplifier stage through a feedback resistor and a grid electrode connected to the anode of the amplifier stage through a coupling resistor, the output circuit of the amplifier being the cathode of the cathode-follower stage and the grounded grid of the differential amplifier stage.

References Cited by the Examiner

UNITED STATES PATENTS

| | | | |
|---|---|---|---|
| 2,350,329 | 6/1944 | Hornfeck | 73—362 |
| 2,612,780 | 10/1952 | De Bruyne | 73—362 |
| 2,736,784 | 2/1956 | Gore | 338—30 |
| 2,818,482 | 12/1957 | Bennet | 338—30 |
| 2,891,158 | 6/1959 | Gabor | 324—57 |
| 3,017,607 | 1/1962 | Rubens | 324—62 |

OTHER REFERENCES

Temperature, Its Measurement and Control in Science and Industry, by American Institute of Physics, published by Chapman & Hull, Ltd., London, volume 2, 1955.

Electricity and Magnetism, by Starling, published by Longmons, Green and Co. Ltd., New York (page 268 relied on).

Low Temperature Physics, by Squire 1953, published by McGraw-Hill Book Co., Inc., New York (page 147 relied on).

ISAAC LISANN, *Primary Examiner.*